United States Patent
Kim et al.

(10) Patent No.: US 10,748,249 B2
(45) Date of Patent: Aug. 18, 2020

(54) IMAGE DATA PROCESSING METHOD AND APPARATUS

(71) Applicants: SAMSUNG ELECTRONICS CO., LTD., Suwon-si (KR); University of Seoul Industry Cooperation Foundation, Seoul (KR)

(72) Inventors: Yongkyu Kim, Hwaseong-si (KR); Kichul Kim, Seoul (KR); Hojung Kim, Suwon-si (KR); Hongseok Lee, Seongnam-si (KR)

(73) Assignees: SAMSUNG ELECTRONICS CO., LTD., Suwon-si (KR); University of Seoul Industry Cooperation Foundation, Seoul (KR)

( * ) Notice: Subject to any disclaimer, the term of this patent is extended or adjusted under 35 U.S.C. 154(b) by 164 days.

(21) Appl. No.: 16/018,323

(22) Filed: Jun. 26, 2018

(65) Prior Publication Data

US 2019/0172179 A1 Jun. 6, 2019

(30) Foreign Application Priority Data

Dec. 1, 2017 (KR) .................. 10-2017-0164332

(51) Int. Cl.
*G06T 3/40* (2006.01)
*G06T 7/50* (2017.01)
(Continued)

(52) U.S. Cl.
CPC ............ *G06T 3/4084* (2013.01); *G02B 30/00* (2020.01); *G03H 1/0808* (2013.01);
(Continued)

(58) Field of Classification Search
CPC .............. A61B 5/7257; G03H 1/2294; G03H 2210/30; G03H 1/2249; G06T 3/4084; G06T 2207/20056
See application file for complete search history.

(56) References Cited

U.S. PATENT DOCUMENTS

| 6,353,689 B1 * | 3/2002 | Kanamaru | ............... G06T 5/10 |
| | | | 382/280 |
| 8,363,295 B2 * | 1/2013 | Wilson | ................ G03H 1/0808 |
| | | | 359/9 |

(Continued)

FOREIGN PATENT DOCUMENTS

| CN | 101674770 B | 2/2013 |
| JP | 2010-511899 A | 4/2010 |

(Continued)

OTHER PUBLICATIONS

Park et al., "Characteristics of complex light modulation through an amplitude-phase double- layer spatial light modulator", Optics Express, vol. 25, No. 4, Feb. 9, 2017, 12 pages total, XP055384343.

(Continued)

*Primary Examiner* — Dung Hong
(74) *Attorney, Agent, or Firm* — Sughrue Mion, PLLC (57) ABSTRACT

A method and apparatus for converting first image data corresponding to a first depth and second image data corresponding to a second depth may be used for displaying a 3D image represented by the first image data and the second image data and performing FFT on the converted first image data and the converted second image data.

18 Claims, 7 Drawing Sheets

(51) Int. Cl.
*G03H 1/08* (2006.01)
*G06T 15/10* (2011.01)
*G09G 3/00* (2006.01)
*G06F 17/14* (2006.01)
*G02B 30/00* (2020.01)

(52) U.S. Cl.
CPC ......... *G03H 1/0866* (2013.01); *G06F 17/142* (2013.01); *G06T 7/50* (2017.01); *G06T 15/10* (2013.01); *G09G 3/003* (2013.01); *G03H 2210/441* (2013.01); *G06T 2207/20056* (2013.01)

(56) References Cited

U.S. PATENT DOCUMENTS

| | | | |
|---|---|---|---|
| 8,384,908 B2 | 2/2013 | Sugita et al. | |
| 9,727,970 B2 | 8/2017 | Song et al. | |
| 10,222,204 B2 | 3/2019 | Yahng et al. | |
| 2007/0070079 A1* | 3/2007 | Chung | G06T 15/005 345/582 |
| 2009/0002787 A1* | 1/2009 | Cable | G03H 1/2294 359/9 |
| 2009/0128619 A1* | 5/2009 | Mash | G03H 1/2294 348/40 |
| 2013/0201355 A1* | 8/2013 | Seki | H04N 5/225 348/207.1 |
| 2016/0041524 A1* | 2/2016 | Song | G03H 1/0808 359/9 |
| 2016/0290782 A1* | 10/2016 | Girshovitz | G01B 11/0675 |
| 2019/0121291 A1* | 4/2019 | Leister | G03H 1/2294 |

FOREIGN PATENT DOCUMENTS

| | | |
|---|---|---|
| JP | 2017-75945 A | 4/2017 |
| KR | 10-2009-0043210 A | 5/2009 |
| KR | 10-2016-0017489 A | 2/2016 |

OTHER PUBLICATIONS

Sorensen et al., "Real-Valued Fast Fourier Transform Algorithms", I.E.E.E. Transactions on Acoustics, Speech, and Signal Processing, vol. ASSP-35, No. 6, Jun. 1987, pp. 849-863, 15 pages total, XP000610391.

Roh et al., "Full-color holographic projection display system featuring an achromatic Fourier filter", Optics Express, Jun. 19, 2017, pp. 14774-14782, 9 pages total, XP055533147.

An et al., "Binocular Holographic Display with Pupil Space Division Method", SID International Symposium Digest of Technical Papers, Jun. 2015, pp. 522-525, 4 pages total, XP009501734.

Im et al., "Phase-regularized polygon computer-generated holograms", Optics Letters, Optical Society of America, vol. 39, No. 12, Jun. 15, 2014, pp. 3642-3645, 4 pages total, XP001589965.

Communication dated May 17, 2019 issued by the European Intellectual Property Office in counterpart European Application No. 18196437.0.

* cited by examiner

IMAGE DATA PROCESSING METHOD AND APPARATUS

CROSS-REFERENCE TO RELATED APPLICATION

This application claims priority from Korean Patent Application No. 10-2017-0164332, filed on Dec. 1, 2017, in the Korean Intellectual Property Office, the disclosure of which is incorporated herein in its entirety by reference.

BACKGROUND

1. Field

Apparatuses and methods consistent with exemplary embodiments related to image data processing.

2. Description of the Related Art

In recent years, many studies have been done on three-dimensional (3D) image-related technology. Also, devices for implementing high-quality holograms in real time by using a complex spatial light modulator (SLM) capable of controlling the amplitude and phase of light at the same time have been studied actively.

Computer-generated holograms (CGH) have recently been used to reproduce holographic moving images. In this regard, image data processing apparatuses are used to calculate hologram values for respective positions on a hologram plane. Calculating these values requires a huge amount of computation. Image data processing apparatuses according to some technologies need to perform a complicated operation, such as a Fourier transform, to express a point in a space.

An image data processing apparatus, such as a television (TV), a mobile device, etc., may process image data to reproduce holographic images. In this case, the image data processing apparatus may perform a Fourier transform on image data and reproduce an image based on the Fourier-transformed data.

Image data processing is time consuming due to the quite large amount of computations required. In particular, as portable devices such as mobile devices are limited by their size and available power, there is a need for a method of reducing the number of computations and amount of time required for performing image data processing.

SUMMARY

One or more exemplary embodiments may provide methods and apparatuses for more efficiently processing image data.

Additional exemplary aspects and advantages will be set forth in part in the description which follows and, in part, will be apparent from the description, or may be learned by practice of the presented embodiments.

According to an aspect of an exemplary embodiment, an image data processing apparatus includes: a receiver configured to receive first image data corresponding to a first depth and second image data corresponding to a second depth; and a processor configured to convert the first image data and the second image data used for displaying a 3D image represented by the first image data and the second image data and to perform a fast Fourier transform (FFT) on the converted first image data and second image data by using a real part operation method and an imaginary part operation method.

The processor may be configured to perform the FFT on the converted first image data by using the real part operation method and perform the FFT on the converted second image data by using the imaginary part operation method.

The processor may include a FT module configured to perform a first FT on the image data, wherein the first FFT on the converted first image data and the first FFT on the converted second image data are performed in the first FT module.

The processor may be configured to perform the first FFT on the converted first image data and the first FFT on the converted second image data in a superposition manner.

The processor may be configured to perform a representation operation to convert a format of the first image data and the second image data for displaying the 3D image, where a representation operation is an operation in which the format of the received image data is converted so that the received data is used for a display of a 3D image.

The processor may be configured to perform a normalization operation on the first image data and the second image data.

The processor may be configured to perform the FFT on the converted first image data and the converted second image data based on symmetry according to a FT.

The image data processing apparatus may further include a display configured to display the 3D image by using a result of performing the FFT.

The 3D image may include a hologram image.

The FFT may include an inverse FFT.

According to an aspect of another exemplary embodiment, an image data processing method includes: receiving first image data corresponding to a first depth and second image data corresponding to a second depth; and converting the first image data and the second image data used for displaying a 3D image represented by the first image data and the second image data; and performing a fast Fourier transform (FFT) on the converted first image data and second image data by using a real part operation method and an imaginary part operation method. The converting the first image data and the second image data comprises performing the representation operation on the image data.

According to an aspect of another exemplary embodiment, there is provided a non-transitory computer-readable recording medium having recorded thereon a program for performing, when executed by a computer, the image data processing method.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Reference will now be made in detail to exemplary embodiments presented only for illustration, with reference to the accompanying drawings. The exemplary embodiments are merely described below to explain aspects and are not intended to limit the scope of claims. What one of ordinary skill in the art may easily infer from the detailed description and the exemplary embodiments is construed as being included in the scope of claims. As used herein, the term "and/or" includes any and all combinations of one or more of the associated listed items. Expressions such as "at least one of," when preceding a list of elements, modify the entire list of elements and do not modify the individual elements of the list.

The terms "composed of" or "include" used herein should not be construed as including all of various elements or operations described in the specification, and should be construed as not including some of the various elements or operations or as further including additional elements or operations.

While such terms as "first" and "second" may be used herein to describe various elements, such elements must not be limited to the above terms. The above terms are used only to distinguish one element from another. Also, terms including ordinal numbers may be interpreted as different elements in different drawings, unless otherwise described, but are not limited thereto.

The present exemplary embodiments relate to rendering methods and apparatuses, and detailed descriptions of information widely known to one of ordinary skill in the art to which the exemplary embodiments described below pertain are omitted.

Hereinafter, exemplary embodiments will be described in detail with reference to the accompanying drawings.

Figure 1:
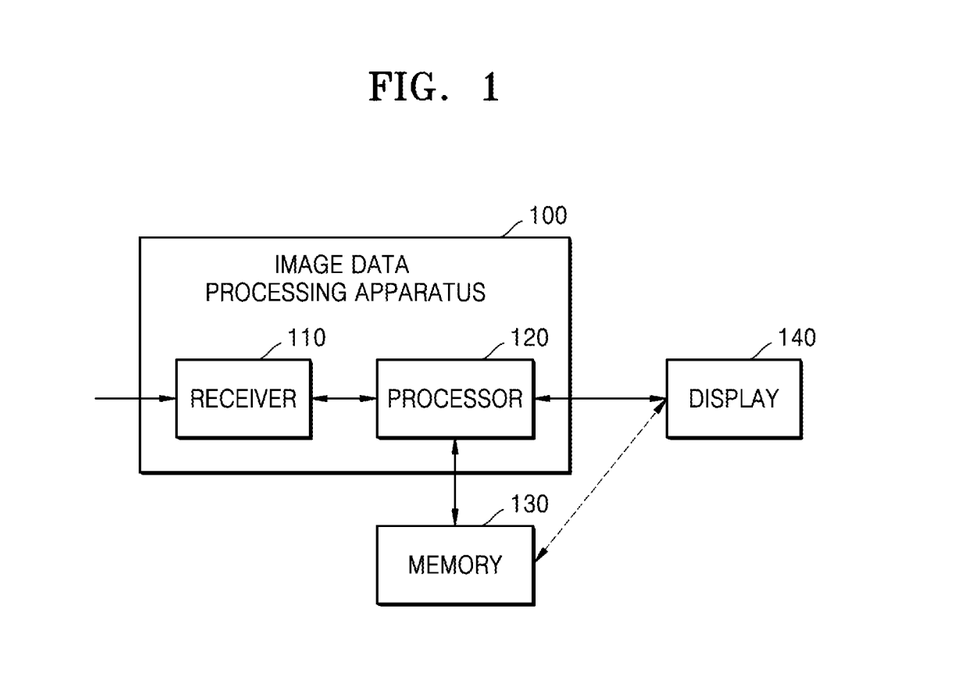
FIG. 1 is a block diagram of an image data processing apparatus according to an exemplary embodiment.

FIG. 1 is a block diagram of an image data processing apparatus 100 according to an exemplary embodiment. It will be understood by one of ordinary skill in the art that other general elements may be further included in addition to the elements illustrated in FIG. 1. Alternatively, according to another exemplary embodiment, it will be understood by one of ordinary skill in the art that some of the elements illustrated in FIG. 1 may be omitted.

Referring to FIG. 1, the image data processing apparatus 100 may include a receiver 110 and a processor 120. The image data processing apparatus 100 may include a one or more of a memory 130 and a display 140, or these elements may be external to the image data processing apparatus 100.

The receiver 110 according to an exemplary embodiment may obtain image data from an source external to the image data processing apparatus 100. For example, the receiver 110 may receive image data including depth information. The receiver 110 may receive first image data corresponding to a first depth, second image data corresponding to a second depth, third image data corresponding to a third depth, and the like.

The display 140 may display an image under control of the processor 120. The display 140 may receive data from the processor 120 and display an image based on the received data. Alternatively, the display 140 may display an image by using data directly received from the memory 130 under control of the processor 120.

The processor 120, according to an exemplary embodiment, may use a layer-based algorithm. The processor 120 may perform calculations by splitting a reproduction region of a hologram into layers based on depth. The processor 120 may perform a Fourier transform, a fast Fourier transform (FFT), an inverse Fourier transform, or an inverse fast Fourier transform (IFFT) on each split layer. For example, the processor 120 may obtain data regarding one pixel of a hologram image by performing an FFT more than twice. The FFT below may include a Fourier transform.

A coordinate value according to an exemplary embodiment may vary according to a criterion. Accordingly, even coordinate values corresponding to the same pixel may be different depending on the criterion. For example, while a coordinate value of a hologram image corresponding to a location on the display 140 is a first coordinate value (x1, y1), a coordinate value of the hologram image corresponding to a location of a pupil is a second coordinate value (u, v), and a coordinate value of the hologram image corresponding to a location of a retina is a third coordinate value (x2, y2). The first coordinate value (x1, y1), the second coordinate value (u, v), and the third coordinate value (x2, y2), all corresponding to the same pixel, may be different from one another.

The processor 120 according to an exemplary embodiment may use a focus term to process image data. According to an exemplary embodiment, the focus term may be used in focusing a hologram image. The processor 120 may perform a first Fourier transform, which is an FFT related to a region from the display 140 to the pupil. Also, the processor 120 may perform a second Fourier transform, which is an FFT related to a region regarding from the pupil to the retina. The processor 120 may use a value, obtained by multiplying a result of the first Fourier transform by the focus term, as an input of the second Fourier transform. The focus term may be obtained from a lookup table. For example, the processor 120 may obtain a focus term corresponding to the second coordinate value (u, v) from a lookup table stored in the memory 130, but the inventive concept is not limited thereto.

The receiver 110 according to an exemplary embodiment may receive image data. The image data received by the receiver 110 may include depth information and color information of an object. For example, the image data may include depth information and color information of each pixel of an object to be displayed. For example, the receiver 110 may receive the first image data corresponding to the first depth and the second image data corresponding to the second depth.

The image data may represent a 3D image. The image data representing the 3D image may include depth data. For example, the image data may include pixel data corresponding to each depth. In this case, the image data according to an exemplary embodiment may include first image data for displaying an image having a first depth, second image data for displaying an image having a second depth, third image data for displaying an image having a third depth, nth image data for displaying an image having an nth depth image, and the like.

The 3D image according to an exemplary embodiment may include a hologram image. For example, the 3D image may be recorded on a recording medium in the form of an interference pattern obtained by the interference between an object wave output from a laser and reflected from a subject and a reference wave reflected from a reflector.

An exemplary embodiment in which an FFT is performed will be described below. The exemplary embodiment in which IFFT is performed is substantially an inverse of the case in which the FFT is performed, and thus, a full description thereof may be omitted for the sake of simplicity. Therefore, the embodiment in which IFFT is performed is also interpreted as belonging to the scope of the present disclosure.

The processor 120 may perform a 1D FFT one or more times on the image data received by the receiver 110, based on a first distance.

The first distance may be a predetermined distance. For example, the first distance may correspond to a distance between a pupil and a retina.

The processor 120 may perform tahe1D FFT on the image data received by the receiver 110 in a first direction based on the first distance and may perform a 1D FFT on the image data received by the receiver 110 in a second direction. For example, the processor 120 may perform a 1D FFT in a horizontal direction and a 1D FFT in a vertical direction. As another example, the processor 120 may perform a 1D FFT in the vertical direction and a 1D FFT in the horizontal direction.

The processor 120 may perform scaling on the data obtained by performing the 1D FFT in the first direction and may perform the 1D FFT on the data obtained by performing scaling in the second direction.

The processor 120 according to an exemplary embodiment may convert the first image data and the second image data that may be used for displaying a 3D image represented by the first image data and the second image data.

The processor 120 may perform representation to convert the format of the image data such that the received image data may be used for displaying the 3D image. For example, the image data processing apparatus 100 may perform a normalization operation on the received video data.

Specifically, the processor 120 may perform a representation (for example, the normalization operation) to convert the first image data and the second image data that may be used for displaying the 3D image represented by the first image data and the second image data.

The processor 120 according to an exemplary embodiment may perform an FFT on the converted first image data (e.g., the first image data on which representation is performed) and on the converted second image data (e.g., the second image data on which representation is performed) by using a real part operation method and an imaginary part operation method, respectively.

In order for image data to be displayed, an FT may be performed one or more times. The processor 120 may perform the FFT on the image data in order to display a 3D image represented by the image data.

The processor 120 may perform an FFT on the converted first image data by using a first operation method and may perform an FFT on the converted second image data by using a second operation method.

The processor 120 may use the real part operation method (an operation performed on the real part of the image data) when performing a first FFT on the converted first image data. Also, the processor 120 according to an exemplary embodiment may perform the imaginary part operation method (an operation performed on the imaginary part of the image data) when performing a first FFT on the converted second image data.

The first FFT performed on the converted first image data and the first FFT performed on the converted second image data may be performed in a superposition manner, independently or simultaneously.

The processor 120 may include a plurality of Fourier transform modules for performing FTs. For example, the processor 120 may include a first FT module, a second FT module, an nth FT module, and the like.

The first FT module may perform a first FT on the image data. When an FT is performed for the first time after representation is performed on the image data, the first FT module may perform the FT.

The first FT module may receive two inputs. For example, the first FT module may receive a first input and a second input. As another example, the first FT module may receive a real part input and an imaginary part input. The terms of the real part input and the imaginary part input are terms determined in connection with a characteristic of an FT operation and may be interpreted as two inputs applied to the first FT module that performs a predetermined operation.

When a first FFT is performed on the image data by the first FT module, a first FFT performed on the converted first image data (e.g., the first image data on which representation is performed) and a first FFT on the converted second image data (e.g., the second image data on which representation is performed) may be performed in a superposition manner, independently or simultaneously.

Hereinafter, a theoretical example in which the image data processing apparatus 100 according to an exemplary embodiment performs an inverse FFT (IFFT) will be described. Although only a method of performing an IFFT is described, in order to simplify the entire description, it will be easily understood by one of ordinary skill in the art that the image data processing apparatus 100 may also perform an FFT in a manner the reverse of the IFFT.

A superposition IFFT algorithm may be used in a 1D IFFT operation when calculating the IFFT for each layer. The superposition IFFT algorithm according to an exemplary embodiment uses 8-bit data regarding two independent depths as real part data and imaginary part data in the IFFT operation, respectively, thereby deriving a superimposed IFFT operation result with respect to the two depths in one IFFT operation.

An example of an N-point superposition IFFT algorithm is as follows.

A relationship of [Equation 1] is established on a variable $x_n$ that is $x_n \in \mathbb{R}$.

$$X_k = \mathcal{F}^{-1}[x_n] = \mathfrak{R}[X_k] + j\mathfrak{I}[X_k] \qquad \text{[Equation 1]}$$

At this time, a relationship of [Equation 2] is established by an even/odd symmetry.

$\mathfrak{R}[X_k] = \mathfrak{R}[X_{N-k}], \mathfrak{I}[X_k] = -\mathfrak{I}[X_{N-k}]$  [Equation 2]

Further, [Equation 3] and [Equation 4] are established with respect to $w_n, y_n$ that are $w_n \in \mathbb{C}, y_n \in \mathbb{R}$.

$w_n = x_n + jy_n$  [Equation 3]

$W_k = \mathcal{F}^{-1}[w_n] = \mathfrak{R}[W_k] + j \approx [W_k]$  [Equation 4]

If [Equation 3] is substituted into [Equation 4], [Equation 5] may be obtained by linearity.

$W_k = \mathcal{F}^{-1}[w_n] = \mathcal{F}^{-1}[x_n + jy_n] = \mathcal{F}^{-1}[x_n] + j\mathcal{F}^{-1}[y_n]$  [Equation 5]

[Equation 6] may be established by [Equation 4] and [Equation 5].

$W_k = (\approx [X_k] + j\mathfrak{I}[X_k]) + j(\mathfrak{R}[Y_k] + j\mathfrak{I}[Y_k]) = (\mathfrak{R}[X_k] - \approx [Y_k]) + j(\mathfrak{I}[X_k] + \mathfrak{R}[Y_k])$  [Equation 6]

Therefore, the superimposed IFFT operation result regarding the two depths from each N-point real number data with respect to the two depths may be derived using the superposition IFFT algorithm in [Equation 6]. In order to derive independent IFFT operation results for each depth from the inverse FFT operation results superimposed regarding the two depths from the superimposed IFFT operation result regarding the two depths, [Equation 7] may be established on the even/odd symmetry of $X_k, Y_k$ with respect to $W_k$.

$W_{N-k} = (\mathfrak{R}[X_{N-k}] - \mathfrak{I}[Y_{N-k}]) + j(\mathfrak{I}[X_{N-k}] + \mathfrak{R}[Y_{N-k}]) = (\mathfrak{R}[X_k] + \mathfrak{I}[Y_k]) + j(\mathfrak{R}[Y_k] - \mathfrak{I}[X_k])$  [Equation 7]

Therefore, [Expression 8] may be derived through $W_k$ and $W_{N-k}$ of [Equation 6] and [Equation 7].

$$R[X_k] = \frac{R[W_k] + R[W_{N-k}]}{2}$$

$$\mathfrak{I}[X_k] = \frac{\mathfrak{I}[W_k] + \mathfrak{I}[W_{N-k}]}{2}$$

$$R[Y_k] = \frac{\mathfrak{I}[W_k] + \mathfrak{I}[W_{N-k}]}{2}$$

$$\mathfrak{I}[Y_k] = \frac{R[W_k] + R[W_{N-k}]}{2}$$

[Equation 8]

The image data processing apparatus 100 according to an exemplary embodiment may simultaneously obtain the IFFT operation result of an independent N-point with respect to each of the two depths through operations performed on the four equations of $X_k$ and $Y_k$.

The display 140 according to an exemplary embodiment may display an object under control of the processor 120. An image displayed by the display 140 may be a 3D image. For example, the display 140 may display a hologram image that is the 3D image of the object.

Hereinafter, a method in which the image data processing apparatus 100 processes image data by performing an FFT using a real part operation method and an imaginary part operation method will be described. In particular, a method of efficiently processing image data by performing an FT a plurality of times in a superposition manner when performing first FT is described.

Figure 2:
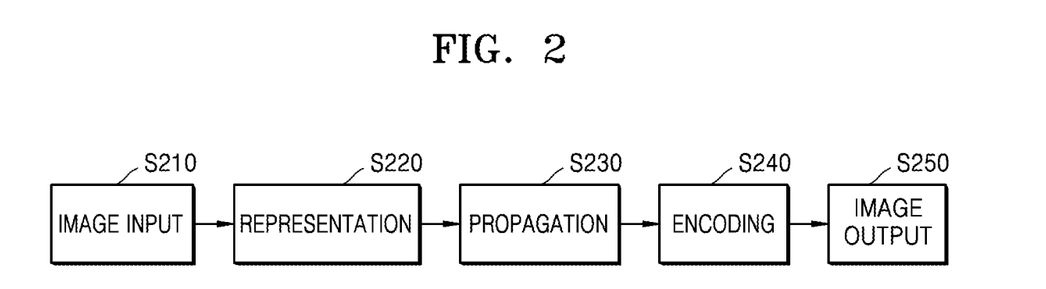
FIG. 2 is a flowchart of a process of processing image data via the image data processing apparatus according to an exemplary embodiment.

FIG. 2 is a flowchart of a process of processing image data via the image data processing apparatus 100 according to an exemplary embodiment. Referring to FIG. 2, the image data processing apparatus 100 may receive image data and may output an image corresponding to the received image data.

FIG. 2 may relate to an exemplary embodiment in which the image data is processed according to a layer-based algorithm, but it is not limited thereto.

The image data processing apparatus 100 may generate a hologram image. According to a holographic technique used for generating a hologram, image data may be recorded on a recording medium in the form of an interference pattern formed by the interference of object waves output from a laser and reflected by an object and reference waves reflected from a reflector. The result produced by the holography technique may be referred to as the hologram. When reconstructing an image stored in the hologram, reference light having, the same wavelength and phase as that used when recording the image may be irradiated onto the recording medium. It also may be possible to artificially generate the hologram. For example, computer-generated holography (CGH) is a technique used to easily produce a hologram using a general computer by mathematically modeling existing optical systems and optical variables. CGH may be used in real time to generate a digital hologram that contains the same 3D image data as would be contained in a hologram created using object and reference light. To generate the hologram using CGH, since a considerable amount of data must be computed in real time, high speed data processing may be important.

The image data processing apparatus 100 may execute various algorithms for calculating the digital hologram in real time and for generating the digital hologram at a high speed. For example, mathematical models for computing CGH include a point cloud algorithm, a polygon algorithm, a layer-based algorithm, etc. A point cloud algorithm is a method of representing a 3D image as a spatial set of points, and thus is suitable for representing an object with various surfaces. The polygon algorithm is a representation of surfaces of a 3D image as polygons. While the polygon algorithm uses FFT, the polygon algorithm requires a comparatively small amount of computation as compared to the point cloud algorithm. The layer-based algorithm is a method of dividing and calculating a reproduction region of a hologram by depth and may generate a hologram by performing FFT or IFFT on each divided layer.

In order to view a layer-based holographic display as an image, as shown in FIG. 2, a propagation operation is performed of converting and correcting input image data having depth information and color information in accordance with a layer based hologram, and two FFT operations are performed for each depth. Then, in order to display the image, the image may be output by converting complex data into an integer value by encoding.

Of all the algorithms shown in FIG. 2, operation S230 may require more than 80% of all the processing resources, and power consumption may also be greatest for this operation. Also, in operation S230, an FFT operation for the region between the screen and a pupil, a focusing operation to express the image in the pupil, and another FFT for the region between the pupil and a retina may be performed.

Hereinafter, each operation will be described in detail.

In operation S210, the image data processing apparatus 100 receives image data. For example, when a layer-based algorithm is applied to image data in a CGH operation, the image data may be color data (or a color image), depth data (or a depth image), etc. The color data may be data indicating a plurality of colors for each layer. For example, the color data may be at least one of red data, blue data, and green data. A layer-based algorithm is a method of processing data of each of a plurality of split planes by dividing a reproduction region of a hologram into planes (layers) based on depth. The image data processing apparatus 100 may perform a Fourier transform or an inverse Fourier transform on data of each split plane during a process of generating or displaying a hologram image.

In operation S220, the image data processing apparatus 100 may convert the form of the image data received in operation S210 in order to perform the propagation operation S230. For example, in operation S220, the image data processing apparatus 100 may perform a normalization operation on data received in operation S210. For example, the image data processing apparatus 100 may match green data with one value from among 0~255 received in operation S210 to one value from among 0~1.

Alternatively, in operation S220, the image data processing apparatus 100 may perform image quality compensation and a field operation. The image data processing apparatus 100 may compensate image data to improve image quality of image data.

In operation S230, the image data processing apparatus 100 may perform a Fourier transform, an FFT, an inverse Fourier transform, or an IFFT.

For example, the image data processing apparatus 100 may perform a Fourier transform on image data in the form of a two-dimensional (2D) matrix. The image data processing apparatus 100 may perform a one-dimensional (1D) Fourier transform twice for a 2D FT. The image data processing apparatus 100 may perform a 1D Fourier transform on the image data in a horizontal direction, and may perform a 1D Fourier transform on transformed image data in a vertical direction. The image data processing apparatus 100 thus generates a holographic image via Fourier transform.

In another exemplary embodiment, the image data processing apparatus 100 may use a focusing value during a process of performing a Fourier transform or an IFT a plurality of times. For example, the image data processing apparatus 100 may perform a first FFT and may use a result obtained by multiplying a result of the first FFT by the focusing value as an input of a second FFT. In another example, the image data processing apparatus 100 may perform a first IFFT and may use a result obtained by multiplying a result of the first IFFT by the focusing value as an input of a second IFFT.

In operation S240, the image data processing apparatus 100 may perform encoding. For example, the image data processing apparatus 100 generates data that is to be inputted to a screen via pixel encoding.

In operation S250, the image data processing apparatus 100 outputs an image via a display. The display may broadly refer to any apparatus for displaying an image.

Figure 3:
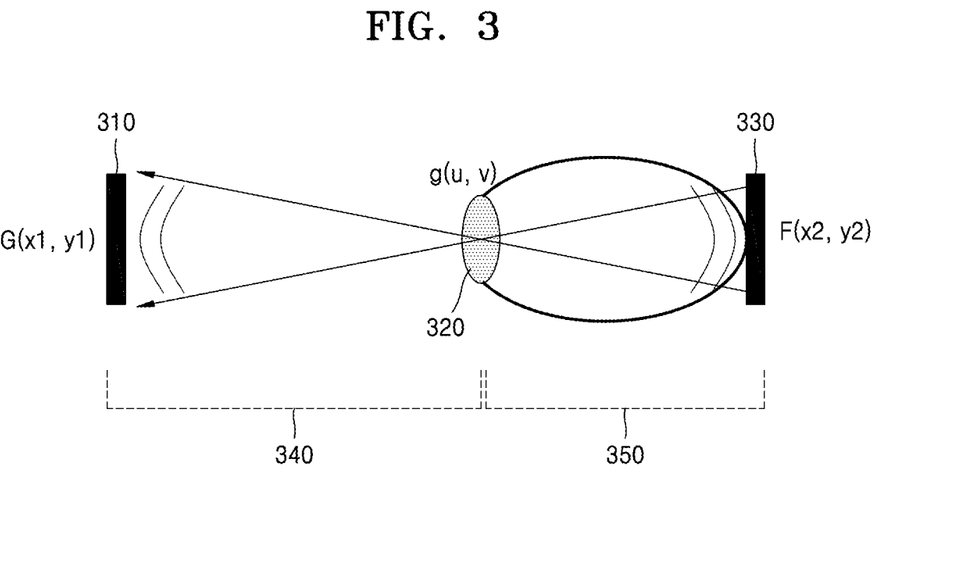
FIG. 3 illustrates a method of performing an operation regarding image data via the image data processing apparatus according to an exemplary embodiment.

FIG. 3 illustrates a method of performing an operation regarding image data via the image data processing apparatus 100 according to an exemplary embodiment. In detail, an operation of image data which is performed during a process in which an image displayed on a display 310 is recognized at a retina 330 via a pupil 320 will be described below.

The image data processing apparatus 100 according to an exemplary embodiment may perform a Fourier transform, an IFT, an FFT, or an IFFT a plurality of times during a process of processing a hologram image.

For example, the image data processing apparatus 100 may perform a first Fourier transform, which is Fourier transform with respect to a first distance 350, which is a region from the pupil 320 to the retina 330. Alternatively, the image data processing apparatus 100 may perform a first IFT, which is an IFT with respect to the first distance 350.

As another example, the image data processing apparatus 100 may perform a second Fourier transform, which is a Fourier transform with respect to a second distance 340, which is a region from the display 310 to the pupil 320. Alternatively, the image data processing apparatus 100 may perform a second IFT, which is an IFT with respect to the second distance 340.

The image data processing apparatus 100 according to an exemplary embodiment may use a focusing value during a process of performing a Fourier transform or an IFT a plurality of times.

For example, a calculation result of a value obtained by the first Fourier transform and the focusing value may be used as an input of a second Fourier transform. For example, the image data processing apparatus 100 may perform a second Fourier transform by applying a value obtained by multiplying the value obtained from first Fourier transform by the focus term as an input of the second Fourier transform. Also, a pixel value used for the hologram image may be determined by using data obtained through the second Fourier transform.

A coordinate value according to an exemplary embodiment may vary according to a criterion. Thus, coordinate values corresponding to the same pixel may be different depending on the criterion. For example, a coordinate value of a hologram image corresponding to a location of the display 310 may be a first coordinate value (x1, y1), a coordinate value of the hologram image corresponding to a location of the pupil 320 may be a second coordinate value (u, v), and a coordinate value of the hologram image corresponding to a location of the retina 330 may be a third coordinate value (x2, y2), and the first coordinate value (x1, y1), the second coordinate value (u, v), and the third coordinate value (x2, y2), all corresponding to the same pixel may be different from one another.

Figure 4:
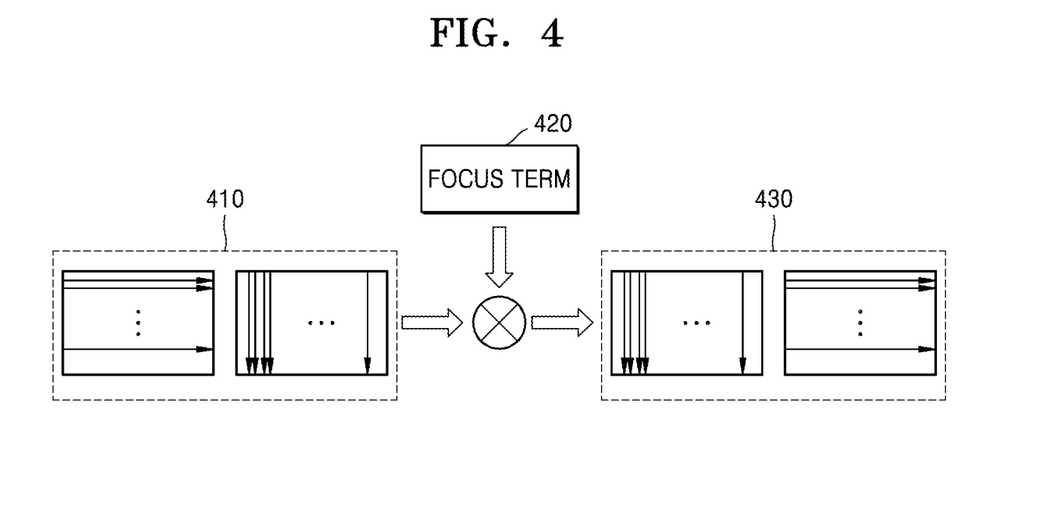
FIG. 4 illustrates a method of processing image data via an image data processing apparatus according to an exemplary embodiment, by performing a Fourier transform or an inverse Fourier transform (IFT) a plurality of times.

FIG. 4 illustrates a method of processing image data via the image data processing apparatus 100 according to an exemplary embodiment by performing a Fourier transform or an IFT a plurality of times.

The Fourier transform or the IFT may be performed in a horizontal direction or a vertical direction. Referring to FIG. 4, the image data processing apparatus 100 may perform a 1D FFT or an IFFT twice on image data during an image data processing process. For example, the image data processing apparatus 100 may generate first data by performing a 1D FFT 410 on image data once in each of the horizontal direction and the vertical direction, and may generate second data by performing a 1D FFT 430, on a value obtained by multiplying the first data by a focus term 420, in each of the horizontal direction and the vertical direction.

As another example, the image data processing apparatus 100 may generate third data by performing a 1D IFFT 410 on the image data in each in of the horizontal direction and the vertical direction, and may generate fourth data by performing a 1D IFFT 430, on a value obtained by multiplying the third data by the focus term 420, in each of the horizontal direction and the vertical direction.

Figure 5:
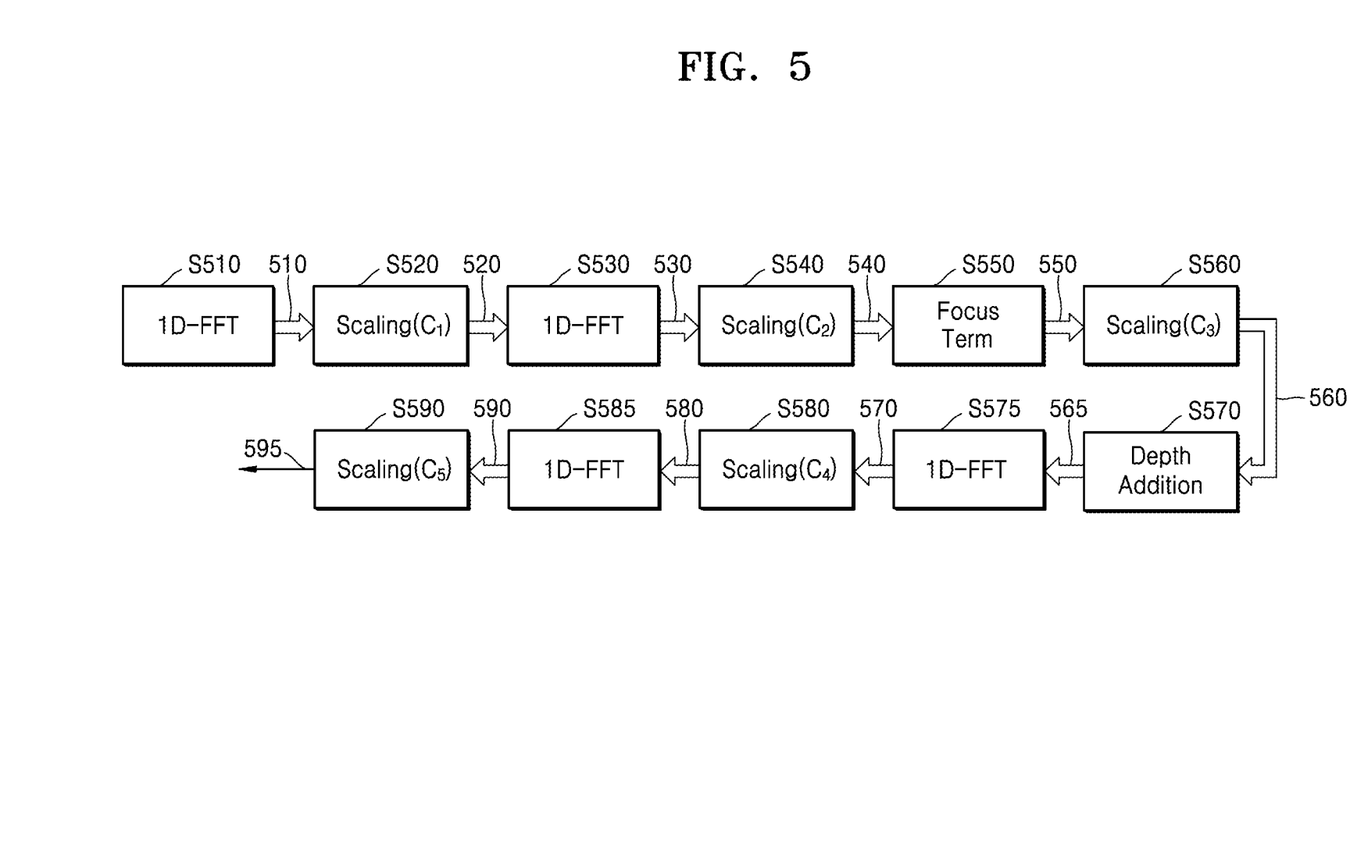
FIG. 5 is a flowchart of a method used by an image data processing apparatus to process image data by using a FT according to an exemplary embodiment.

FIG. 5 is a flowchart of a method in which the image data processing apparatus 100 processes image data by using a FT according to an exemplary embodiment.

In operation S510, the image data processing apparatus 100 performs a 1D FFT. The 1D FFT may be performed in a predetermined direction. For example, the 1D FFT may be performed in a horizontal direction or in a vertical direction. However, as will be described below, in operation S530, a 1D FFT is performed in a direction different from a direction in which the 1D FFT is performed in operation S510.

As a result of performing the 1D FFT in operation S510, first data 510 may be obtained.

In operation S520, the image data processing apparatus 100 may perform first scaling C1 on the first data 510. First scaling C1 may be performed according to a C1 value. For example, the image data processing apparatus 100 may obtain a value obtained by multiplying the first data 510 by C1.

As a result of performing first scaling C1 in operation S520, second data 520 may be obtained.

In operation S530, the image data processing apparatus 100 performs a 1D FFT. The 1D FFT may be performed in a predetermined direction. For example, the 1D FFT may be performed in the horizontal direction or in the vertical direction. In operation S530, the 1D FFT may be performed in a direction different from the direction in which the 1D FFT is performed in operation S510. For example, when the 1D FFT is performed horizontally in operation S510, the 1D FFT may be performed vertically in operation S530.

Third data 530 may be obtained as a result of performing 1D FFT in operation S530.

In operation S540, the image data processing apparatus 100 may perform second scaling C2 on the third data 530. Second scaling C2 may be performed according to a C2 value. For example, the image data processing apparatus 100 may obtain a value obtained by multiplying the third data 530 by C2.

As a result of performing second scaling C2 in operation S540, fourth data 540 may be obtained.

In operation S550, the image data processing apparatus 100 may perform an operation on the fourth data 540 according to the focus term. The focus term may be a predetermined value. For example, the image data processing apparatus 100 may obtain a product of multiplying the fourth data 540 by the focus term.

Fifth data 550 may be obtained as a result of performing the operation according to the focus term in operation S550.

In operation S560, the image data processing apparatus 100 may perform third scaling C3 on the fifth data 550. Third scaling C3 may be performed according to a C3 value. For example, the image data processing apparatus 100 may obtain a value obtained by multiplying the fifth data 550 by C3.

Sixth data 560 may be obtained as a result of performing third scaling C3 in operation S560.

In operation S570, the image data processing apparatus 100 according to an exemplary embodiment may perform a depth addition. The image data processing apparatus 100 may obtain seventh data 565 by performing the depth addition on the sixth data 560.

In operation S575, the image data processing apparatus 100 performs a 1D FFT. The 1D FFT may be performed in a predetermined direction. For example, the 1D FFT may be performed in the horizontal direction or in the vertical direction. However, as will be described below, in operation S585, 1D FFT is performed in a direction different from a direction in which 1D FFT is performed in operation S575.

Eighth data 570 may be obtained as a result of performing 1D FFT in operation S575.

In operation S580, the image data processing apparatus 100 may perform fourth scaling C4 on the eighth data 570. Fourth scaling C4 may be performed according to a C4 value. For example, the image data processing apparatus 100 may obtain a value obtained by multiplying the eighth data 580 by C4.

Ninth data 580 may be obtained as a result of performing fourth scaling C4 in operation S520.

In operation S585, the image data processing apparatus 100 performs a 1D FFT. The 1D FFT may be performed in a predetermined direction. For example, the 1D FFT may be performed in the horizontal direction or in the vertical direction. In operation S585, the 1D FFT is performed in a direction different from a direction in which the 1D FFT is performed in operation S575. For example, when the 1D FFT is performed horizontally in operation S575, the 1D FFT may be performed vertically in operation S585.

Tenth data 590 may be obtained as a result of performing 1D FFT in operation S585.

In operation S590, the image data processing apparatus 100 may perform fifth scaling C5 on the tenth data 590. Fifth scaling C5 may be performed according to a C5 value. For example, the image data processing apparatus 100 may obtain a value obtained by multiplying the tenth data 590 by C5.

In operation S590, eleventh data 595 may be obtained as a result of performing fifth scaling C5.

C1, C2, C3, C4 and C5 may be determined according to mutual values. For example, a product of C1, C2, and C3 may be maintained as a predetermined value. As another example, a product of C1, C2, C3, C4 and C5 may be maintained as a predetermined value.

The image data processing apparatus 100 according to an exemplary embodiment may determine the values of C1 to C5 such that a size of data obtained as a result of each operation does not exceed a memory size. Alternatively, the image data processing apparatus 100 may determine the values of C1 to C5 such that an amount of data to be lost is reduced in consideration of a predetermined memory size. Alternatively, the image data processing apparatus 100 may determine the values of C1 to C5 such that the amount of data loss occurring in finally output data is reduced, in consideration of the predetermined memory size. For example, an overflow may be prevented by determining C1 to C5 such that a size of the first data 510 through the eleventh data 595 does not exceed the memory size.

Referring to FIG. 5, the image data processing apparatus 100 according to an exemplary embodiment may perform the first FFT in operation S510.

The image data processing apparatus 100 according to an exemplary embodiment may independently or simultaneously perform the first FFT on the first image data on which representation is performed and the first FFT on the second image data on which representation is performed.

For example, the image data processing apparatus 100 according to an exemplary embodiment may perform an FFT on the first image data on which representation is performed and on the second image data on which representation is performed by respectively using a real part operation method and an imaginary part operation method.

In order for image data to be displayed, an FT may be performed one or more times. The image data processing apparatus 100 according to an exemplary embodiment may perform an FFT on the image data, thereby displaying a 3D image represented by the image data.

Figure 6:
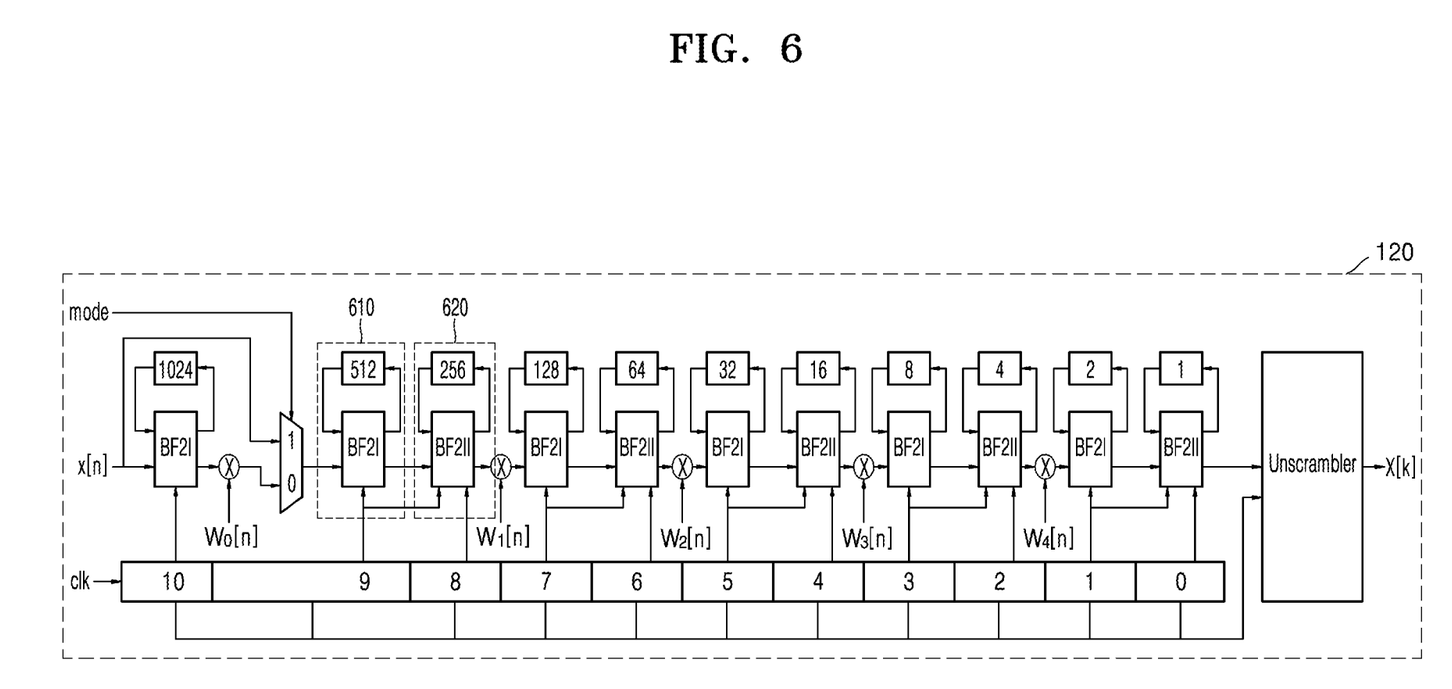
FIG. 6 is a diagram illustrating a method used by an image data processing apparatus to process image data by using one or more FT modules included in a processor according to an exemplary embodiment.

FIG. 6 is a diagram illustrating a method in which the image data processing apparatus 100 processes image data by using one or more FT modules included in the processor 120 according to an exemplary embodiment.

The processor 120 according to an exemplary embodiment may include a plurality of FT modules for performing FT. For example, the processor 120 may include a first FT module 610, a second FT module 620, an nth FT module, and so on.

The first FT module 610 may perform a first FT on the image data. The first FT module 610 may perform the FT when the FT is first performed after the representation of the image data is performed.

The first FT module 610 may receive two or more inputs. For example, the first FT module 610 may receive a first input and a second input. The first FT module 610 may receive a real part input and an imaginary part input. The terms of the real part input and the imaginary part input are terms determined in connection with a characteristic of an FT operation and may be interpreted as the two inputs applied to the first FT module 610 that performs a predetermined operation.

When the first FT module 610 performs a first FFT on the image data, a first FFT performed on converted first image data (e.g., first image data on which representation is performed) and a first FFT performed on converted second image data (e.g., second image data on which representation is performed) may be performed in a superposition manner, independently or simultaneously.

Figure 7:
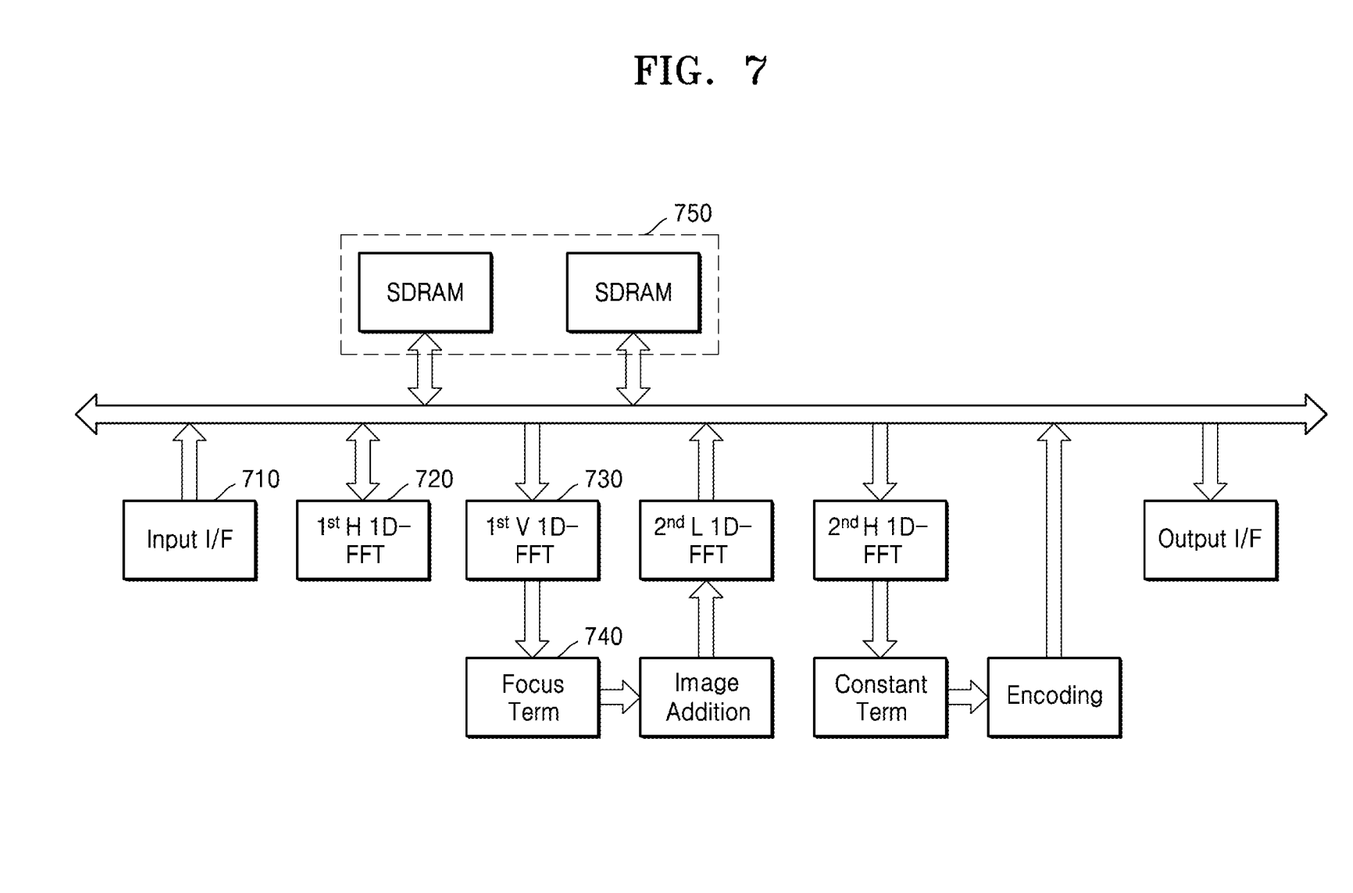
FIG. 7 is a diagram for explaining a method used by an image data processing apparatus to perform image processing by using a first FT module that performs a first FFT according to an exemplary embodiment.

FIG. 7 is a diagram for explaining a method in which the image data processing apparatus 100 performs image processing by using a first FT module 720 that performs a first FFT according to an exemplary embodiment.

The image data processing apparatus 100 according to an exemplary embodiment may include an input unit 710 applying an input, the first FT module 720, a second FT module 730, a focusing operation module 740, a memory 750, and the like.

It will be understood by one of ordinary skilled in the art that other general-purpose components, other than those components shown in FIG. 7, may be further included. It will be understood by one of ordinary skilled in the art that, according to another exemplary embodiment, some of the components shown in FIG. 7 may be omitted.

The input unit 710 according to an exemplary embodiment may input data that is a target of an FT. For example, the input unit 710 may input image data including depth information. As another example, the input unit 710 may input the image data on which representation is performed.

The first FT module 720 according to an exemplary embodiment may perform a FFT in a first horizontal direction.

When the FFT is performed on the image data in the first FT module 720, the FFT performed on the first image data corresponding to a first depth and the FFT performed on second image data corresponding to a second depth may be performed in a superposition manner, independently or simultaneously.

The image data processing apparatus 100 according to an exemplary embodiment include a plurality of FT modules for performing FT. For example, the image data processing apparatus 100 may include the first FT module 720, a second FT module 730, an nth FT module, and the like.

The first FT module 720 may perform the first FT on the image data. The first FT module 720 may perform the FT when the FT is performed for the first time after representation has been performed on the image data.

The first FT module 720 may receive two inputs. For example, the first FT module 720 may receive a first input and a second input. The first FT module 720 may receive a real part input and an imaginary part input. The terms of the real part input and the imaginary part input are terms determined in connection with a characteristic of an FT operation and may be interpreted as the two inputs applied to the first FT module 720 that performs a predetermined operation.

The second FT module 730 according to an exemplary embodiment may perform an FFT in a first vertical direction. The second FT module 730 may perform the FFT in the first vertical direction by using result data obtained by performing the FFT in the first FT module 720.

The focusing operation module 740 according to an exemplary embodiment may perform a focusing operation. The description provided above in FIGS. 1 and 3 may be referred to for details about the focusing operation.

The memory 750 according to an exemplary embodiment may store various types of data used in operation processes. The memory 750 may be include one or more static random access memories (SRAM) as shown in the figure, but is not limited thereto.

Figure 8:
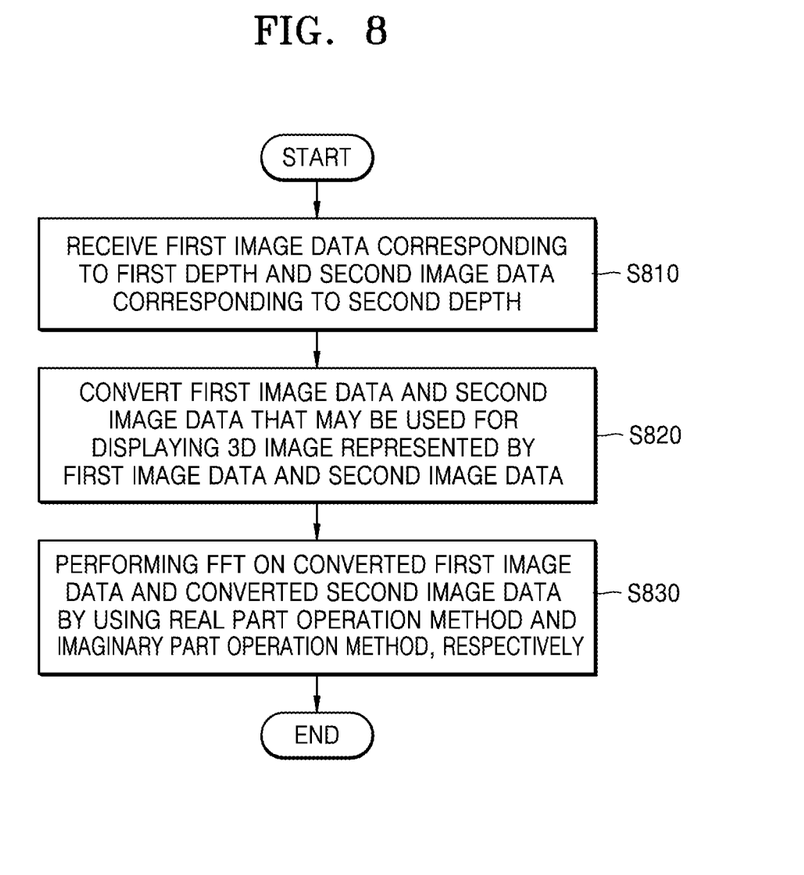
FIG. 8 is a flowchart illustrating a method used by an image data processing apparatus to perform a FFT using an operation performed on a real part of the image data and an operation performed on the imaginary part of the image data according to an exemplary embodiment.

FIG. 8 is a flowchart illustrating a method in which the image data processing apparatus 100 performs an FFT using a real part operation method and an imaginary part operation method according to an exemplary embodiment.

In operation S810, the image data processing apparatus 100 according to an exemplary embodiment receives first image data corresponding to a first depth and second image data corresponding to a second depth.

The image data processing apparatus 100 may receive image data. The image data may represent a 3D image. The image data representing the 3D image may include depth data. For example, the image data may include pixel data corresponding to each depth. In this case, the image data according to an exemplary embodiment may include first image data for representing an image at a first depth, second image data for representing an image at a second depth, third image data for representing an image at a third depth, nth mage data for representing an image of at nth depth, and the like.

The 3D image according to an exemplary embodiment may include a hologram image. For example, the 3D image may be recorded on a recording medium in the form of an interference pattern formed by the interference between an object wave output from a laser and reflected by a subject and a reference wave reflected from a reflector.

In operation S820, the image data processing apparatus 100 according to an exemplary embodiment may convert the first image data and the second image data that may be used for displaying a 3D image represented by the first image data and the second image data.

The image data processing apparatus 100 according to an exemplary embodiment may perform representation to convert the format of image data such that the received image data may be used for displaying the 3D image. For example, the image data processing apparatus 100 may perform a normalization operation on the received video data.

Specifically, the image data processing apparatus 100 according to an exemplary embodiment may perform representation to convert (for example, the normalization operation) the first image data and the second image data that may be used for displaying the 3D image represented by the first image data and the second image data.

In operation S830, the image data processing apparatus 100 according to an exemplary embodiment may perform an FFT on the converted first image data (e.g., the first image data on which representation is performed) and on the converted second image data (e.g., the second image data on which representation is performed) by using a real part operation method and an imaginary part operation method, respectively.

In order for image data to be displayed, an FT may be performed one or more times. The image data processing apparatus 100 according to an exemplary embodiment may perform an FFT on the image data to display a 3D image represented by the image data.

The image data processing apparatus 100 according to an exemplary embodiment may perform an FFT on the converted first image data by using a first operation method and may perform an FFT on the converted second image data by using a second operation method.

The image data processing apparatus 100 according to an exemplary embodiment may use the real part operation method when performing a first FFT on the converted first image data. Also, the image data processing apparatus 100 according to an exemplary embodiment may perform the imaginary part operation method when performing a first FFT on the converted second image data.

The first FFT performed on the first image data converted in operation S820 and the first FFT performed on the second image data converted in operation S820 may be performed in a superposition manner, independently or simultaneously.

Figure 9:
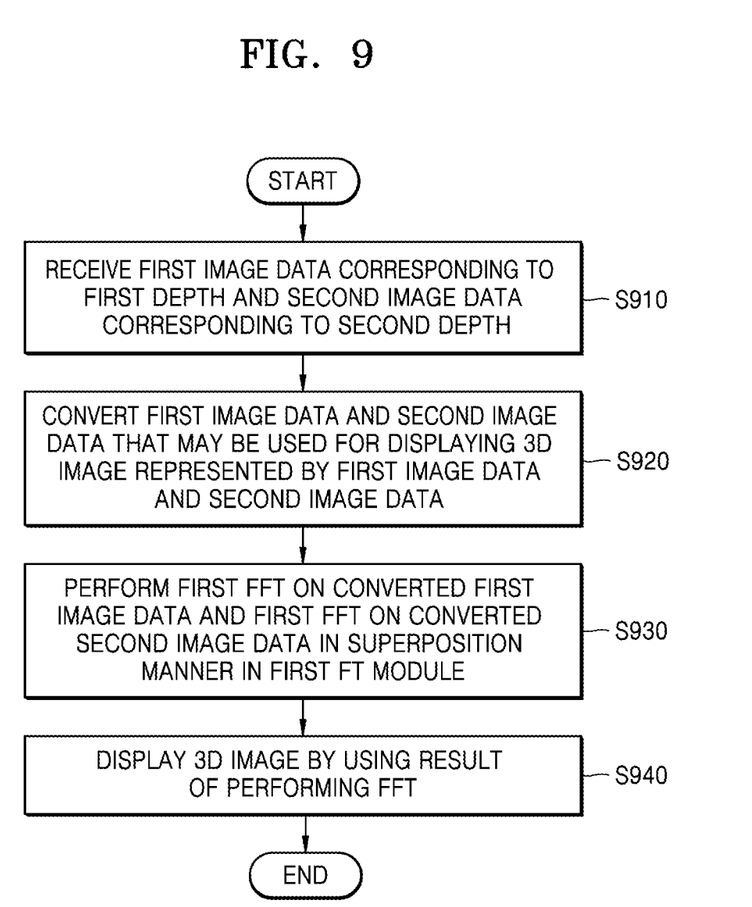
FIG. 9 is a flowchart illustrating a method used by an image data processing apparatus to display a 3D image by performing a FFT in a first FT module in a superposition manner according to an exemplary embodiment.

FIG. 9 is a flowchart illustrating a method in which the image data processing apparatus 100 displays a 3D image by performing FFT in a first FT module in a superposition manner according to an exemplary embodiment.

The disclosure provided with reference to FIG. 8 may be referred to in connection with FIG. 9. Operations S910 and S920 in FIG. 9 correspond to operations S810 and S820 in FIG. 8, respectively, and thus, detailed descriptions thereof will be omitted for the sake of simplicity.

In operation S930, the image data processing apparatus 100 according to an exemplary embodiment performs a first FFT on first image data converted in operation S920 and a first FFT on second image data converted in operation S930 in a first FT module in a superposition manner.

The data processing apparatus 100 according to an exemplary embodiment may include a plurality of FT modules for performing FT. For example, the image data processing apparatus 100 may include a first FT module, a second FT module, an nth FT module, and the like.

The first FT module may perform a first FT on the image data. When an FT is performed for the first time after representation is performed on the image data, the first FT module may perform the FT.

The first FT module may receive two inputs. For example, the first FT module may receive a first input and a second input. The first FT module may receive a real part input and an imaginary part input. The terms of the real part input and the imaginary part input are terms determined in connection with a characteristic of a FT operation and may be interpreted as the two inputs applied to the first FT module that performs a predetermined operation.

When the first FT is performed on the image data in the first FT module, the first FFT performed on the first image data converted in operation S820 and the first FFT performed on the second image data converted in operation S820 may be performed in a superposition manner, independently or simultaneously.

In operation S940, the image data processing apparatus 100 according to an exemplary embodiment displays a 3D image by using a result of the image data processing performed in operation S930. The 3D image may include a hologram image.

According to one or more exemplary embodiments image processing for displaying a 3D image may be efficiently performed in less time.

According to one or more exemplary embodiments, a constant used for image processing may be obtained by using a memory of a smaller size.

The apparatuses described herein may include a processor, a memory for storing and executing program data, a permanent storage unit such as a disk drive, a communications port for handling communications with external devices, and user interface devices, including a touch panel, keys, buttons, etc. When software modules or algorithms are involved, these software modules may be stored as program instructions or computer-readable codes executable on a processor on a computer-readable recording medium. Examples of the computer-readable recording medium include magnetic storage media (e.g., read-only memory (ROM), random-access memory (RAM), floppy disks, hard disks, etc.), and optical recording media (e.g., CD-ROMs, or digital versatile discs (DVDs)). The computer-readable recording medium may also be distributed over network-coupled computer systems so that the computer-readable code is stored and executed in a distributive manner. This media may be read by the computer, stored in the memory, and executed by the processor.

The particular implementations shown and described herein are illustrative examples and are not intended to otherwise limit the technical scope in any way. For the sake of brevity, conventional electronics, control systems, software development and other functional aspects of the systems may not be described in detail. Also, the connecting lines, or connectors shown in the various figures presented are intended to represent functional relationships and/or physical or logical couplings between the various elements. It should be noted that many alternative or additional functional relationships, physical connections or logical connections may be present in a practical apparatus.

It should be understood that exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An image data processing apparatus comprising:
   a receiver configured to receive first image data corresponding to a first depth and second image data corresponding to a second depth;
   a processor configured to convert the first image data and the second image data used for displaying a 3D image represented by the first image data and the second image data and to perform a fast Fourier transform (FFT) on the converted first image data and on the converted second image data by using a real part operation method and an imaginary part operation method, and perform a first FFT with respect to a first distance corresponding to a distance between a pupil and a retina, and perform a second FFT with respect to a second distance corresponding to a distance between the display and the pupil; and
   a display configured to display the 3D image using a result of the FFT.

2. The image data processing apparatus of claim 1, wherein the processor is configured to perform the FFT on the converted first image data by using the real part operation method and to perform the FFT on the converted second image data by using the imaginary part operation method.

3. The image data processing apparatus of claim 2, wherein the processor comprises an FT module configured to perform the FFT on image data,
wherein the FFT performed on the converted first image data and the FFT performed on the converted second image data are performed in a first FT module.

4. The image data processing apparatus of claim 3, wherein the processor is configured to perform the FFT on the converted first image data and to perform the first FFT on the converted second image data in a superposition manner.

5. The image data processing apparatus of claim 1, wherein the processor is further configured to perform a representation operation and thereby convert a format of the first image data and the second image data into data configured to display the 3D image.

6. The image data processing apparatus of claim 1, wherein the processor is further configured to perform a normalization operation on the first image data and the second image data.

7. The image data processing apparatus of claim 1, wherein the processor is further configured to perform the FFT on the converted first image data and the converted second image data based on symmetry according to an FT.

8. The image data processing apparatus of claim 1, wherein the 3D image comprises a hologram image.

9. The image data processing apparatus of claim 1, wherein the FFT comprises an inverse FFT.

10. An image data processing method comprising:
receiving first image data corresponding to a first depth and second image data corresponding to a second depth; and
converting the first image data and the second image data used for displaying a 3D image represented by the first image data and the second image data;
performing a fast Fourier transform (FFT) on the converted first image data and on the second image data by using a real part operation method and an imaginary part operation method;
performing a first FFT with respect to a first distance corresponding to a distance between a pupil and a retina, and a second FFT with respect to a second distance corresponding to a distance between the display and the pupil; and
displaying the 3D image using a result of the FFT.

11. The image data processing method of claim 10, wherein the performing FFT comprises:
performing the FFT on the converted first image data by using the real part operation method and performing the FFT on the converted second image data by using the imaginary part operation method.

12. The image data processing method of claim 11, wherein the FFT performed on the converted first image data and the FFT performed on the converted second image data are performed in a first FT module.

13. The image data processing method of claim 12, wherein the performing FFT comprises:
performing the FFT on the converted first image data and performing the FFT on the converted second image data in a superposition manner.

14. The image data processing method of claim 10, wherein the converting the first image data and the second image data comprises:
performing a representation operation to convert a format of the first image data and the second image data used for displaying the 3D image.

15. The image data processing method of claim 10, wherein the converting the first image data and the second image data comprises:
performing a normalization operation on the first image data and the second image data.

16. The image data processing method of claim 10, wherein the performing the FFT comprises:
performing the FFT on the converted first image data and the converted second image data based on symmetry according to an FT.

17. The image data processing method of claim 10, wherein the 3D image comprises a hologram image.

18. A non-transitory computer-readable recording medium having recorded thereon a program, which, when executed by a processor, causes the processor to perform a method comprising:
receiving first image data corresponding to a first depth and second image data corresponding to a second depth; and
converting the first image data and the second image data used for displaying a 3D image represented by the first image data and the second image data;
performing a fast Fourier transform (FFT) on the converted first image data and on the second image data by using a real part operation method and an imaginary part operation method;
performing a FFT with respect to a first distance corresponding to a distance between a pupil and a retina, and a second FFT with respect to a second distance corresponding to a distance between the display and the pupil; and
displaying the 3D image using a result of the FFT.

* * * * *